(12) United States Patent
Chiu et al.

(10) Patent No.: US 9,317,171 B2
(45) Date of Patent: Apr. 19, 2016

(54) SYSTEMS AND METHODS FOR IMPLEMENTING AND USING GESTURE BASED USER INTERFACE WIDGETS WITH CAMERA INPUT

(71) Applicant: FUJI XEROX CO., LTD., Tokyo (JP)

(72) Inventors: Patrick Chiu, Mountain View, CA (US); Qiong Liu, Cupertino, CA (US); Maribeth Joy Back, Los Gatos, CA (US); Sven Kratz, San Jose, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 72 days.

(21) Appl. No.: 13/865,990

(22) Filed: Apr. 18, 2013

(65) Prior Publication Data

US 2014/0313363 A1 Oct. 23, 2014

(51) Int. Cl.
*G06F 3/048* (2013.01)
*G06F 3/0488* (2013.01)
*G06F 3/042* (2006.01)

(52) U.S. Cl.
CPC .............. *G06F 3/048* (2013.01); *G06F 3/0425* (2013.01); *G06F 3/0488* (2013.01)

(58) Field of Classification Search
None
See application file for complete search history.

(56) References Cited

U.S. PATENT DOCUMENTS

| | | | | |
|---|---|---|---|---|
| 5,936,615 | A * | 8/1999 | Waters | 345/173 |
| 6,252,598 | B1 * | 6/2001 | Segen | 715/863 |
| 2005/0025347 | A1 * | 2/2005 | Makram-Ebeid et al. | 382/128 |
| 2008/0158686 | A1 * | 7/2008 | Chechelniker | 359/631 |
| 2009/0115915 | A1 * | 5/2009 | Steinberg et al. | 348/745 |
| 2009/0293009 | A1 * | 11/2009 | Meserth et al. | 715/771 |
| 2011/0169748 | A1 * | 7/2011 | Tse et al. | 345/173 |
| 2011/0209088 | A1 * | 8/2011 | Hinckley et al. | 715/810 |
| 2011/0246875 | A1 * | 10/2011 | Parker et al. | 715/702 |
| 2011/0283188 | A1 * | 11/2011 | Farrenkopf et al. | 715/702 |
| 2012/0192117 | A1 * | 7/2012 | Migos et al. | 715/863 |
| 2013/0022274 | A1 * | 1/2013 | Lawrence Ashok Inigo et al. | 382/195 |
| 2013/0215148 | A1 * | 8/2013 | Antonyuk et al. | 345/633 |
| 2013/0257751 | A1 * | 10/2013 | Stafford | G06F 3/0488 345/173 |

OTHER PUBLICATIONS

Borkowski, Stanislaw, Julien Letessier, and James L. Crowley. "Spatial control of interactive surfaces in an augmented environment." Engineering Human Computer Interaction and Interactive Systems. Springer Berlin Heidelberg, 2005. 228-244.*

(Continued)

*Primary Examiner* — Chan Park
*Assistant Examiner* — Geoffrey E Summers
(74) *Attorney, Agent, or Firm* — Pavel I. Pogodin; TransPacific Law Group

(57) ABSTRACT

Described is an approach to gesture interaction that is based on user interface widgets. In order to detect user gestures, the widgets are provided with hotspots that are monitored using a camera for predetermined patterns of occlusion. A hotspot is a region where a user interacts with the widget by making a gesture over it. The user's gesture may be detected without the user physically touching the surface displaying the widget. The aforesaid hotspots are designed to be visually salient and suggestive of the type of gestures that can be received from the user. Described techniques are advantageous in relation to conventional systems, such as systems utilizing finger tracking, in that they can better support complex tasks with repeated user actions. In addition, they provide better perceived affordance than conventional systems that attempt to use widgets that are not designed for gesture input, or in-the-air gesture detection techniques that lack any visual cues.

21 Claims, 19 Drawing Sheets

(56) References Cited

OTHER PUBLICATIONS

Borkowski, Stanislaw. "Steerable interfaces for interactive environments." (2006).*

Bouman, Charles A. "Interpolation and Decimation." ECE 637: Digital Image Processing I. Purdue University, West Lafayette, IN. Jan. 10, 2011. Web. Aug. 19, 2014. <https://engineering.purdue.edu/~bouman/ece637/previous/ece637S2011/notes/pdf/RateConversion.pdf>.*

Kjeldsen, Rick. "Exploiting the flexibility of vision-based user interactions." Proc. of 11th International Conference on Human Computer Interaction, Las Vegas, NV. 2005.*

"LCD Projector." Wikipedia. Wikimedia Foundation, Apr. 2, 2010. Web. Feb. 23, 2015.*

"PAL." Wikipedia. Wikimedia Foundation, Feb. 27, 2011. Web. Feb. 18, 2015.*

Dedual, Nicolas J., Ohan Oda, and Steven K. Feiner. "Creating hybrid user interfaces with a 2D multi-touch tabletop and a 3D see-through head-worn display." Mixed and Augmented Reality (ISMAR), 2011 10th IEEE International Symposium on. IEEE, 2011.*

Lee, Gun A., Mark Billinghurst, and Gerard Jounghyun Kim. "Occlusion based interaction methods for tangible augmented reality environments." Proceedings of the 2004 ACM SIGGRAPH international conference on Virtual Reality continuum and its applications in industry. ACM, 2004.*

Kane, S.K., et al.. Bonfire: a nomadic system or hybrid laptop-tabletop interaction. Proc. of UIST '09, pp. 129-138.

Kjeldsen, R., C., et al. Interacting with steerable projected displays. Intl. Conf. on Automatic Face and Gesture Recognition (FGR '02), pp. 402-407.

Liao, C., et al. Fact: Fine-grained cross-media interaction with documents via a portable hybrid paper-laptop interface. Proc. of ACM Multimedia 2010, pp. 361-370.

Liao, C ., Liu, Q. MixPad: Augmenting interactive paper with mice & keyboards for fine-grained cross-media interaction with documents. UbiComp 2011 (demo), pp. 539-540.

Finhanez, C., et al. Creating touch-screens anywhere with interactive projected displays. Proc. ACM Multimedia '03 (demo), pp. 460-461, Berkeley CA, USA.

Wachs, J., et al. A gesture-based tool for sterile browsing of radiology images. J. American Medical Informatics Assoc., 15 (3) 321-323 (2008).

Wellner, P. The DigitalDesk calculator: tangible manipulation on a desk top display. Proc. UIST '91, pp. 27-33.

Wilson, A. D. Robust computer vision-based detection of pinching for one and two-handed gesture input. Proc. UIST '06, pp. 255-258.

Wilson, A.D. Using a depth camera as a touch sensor. Proc. ITS '10, pp. 69-72.

Celluon Magic Cube projection keyboard. http://celluon.com/products.php, visited on Jun. 11, 2013.

Kinect. http://www.xbox.com/en-US/KINECT, visited on Jun. 11, 2013.

OpenCV. http://opencv.willowgarage.com/wiki, visited on Jun. 11, 2013.

* cited by examiner

SYSTEMS AND METHODS FOR IMPLEMENTING AND USING GESTURE BASED USER INTERFACE WIDGETS WITH CAMERA INPUT

BACKGROUND OF THE INVENTION

1. Technical Field

The disclosed embodiments relate in general to user interfaces of computing devices and, more specifically, to systems and methods for implementing and using gesture based user interface widgets with camera input.

2. Description of the Related Art

Gesture input is now a common way to interact with various computer systems. Examples of gesture-based user interfaces include touchscreens on phones and tablets, as well as in-the-air touchless gesture controllers for gaming systems. Research systems include gesture input for projected displays such as the IBM Everywhere Displays system described in Kjeldsen, R., C., Pingali, G., Hartman, J., Levas, T., Podlaseck, M. Interacting with steerable projected displays. Intl. Conf. on Automatic Face and Gesture Recognition (FGR '02), pp. 402-407 and Pinhanez, C., Kjeldsen, R., Tang, L., Levas, A., Podlaseck, M., Sukaviriya, N. and Pingali, G. Creating touch-screens anywhere with interactive projected displays. Proc. ACM Multimedia '03 (demo), pp. 460-461. More specialized applications include systems for enabling browsing of medical images such as the system described in Wachs, J., Stern, H., Edan, Y., Gillam, M., Handler, J., Feied, C., Smith, M. A gesture-based tool for sterile browsing of radiology images, J. American Medical Informatics Assoc., 15 (3) 321-323 (2008).

For projected displays and other systems that lack gesture support, it would be useful to enable such input capabilities in a low-cost and robust way. Often this is accomplished by using a video camera (e.g. a webcam) as an input device to track the user's finger or hand. In the case of the Everywhere Displays system, the objective of finger tracking is to detect touch events on a projected display. For the aforesaid system used in a medical setting where it is important to maintain sterile and hence not desirable for the user to touch the display, hand tracking is used to detect in-the-air touchless gestures.

The problems of employing a low-cost video camera for finger and hand tracking are the following. Because a single camera cannot provide depth information, the "touch gesture" must be identified indirectly from the gesture motion. In the Everywhere Displays system, described above, a touch event is defined to occur when the user's fingertip moves to the button and then away from the button. As would be appreciated by those of skill in the art, this does not work for common tasks like pressing the "Next" button repeatedly in a slideshow application, or pressing buttons on a virtual keypad without retracting the hand.

Another problem that was noticed in connection with the aforesaid Everywhere Displays system is that when users see a regular button, they tend to want to press on it (rather than make the "touch gesture"). This issue arises due to the lack of perceived affordance as the user cannot really figure out the correct way to interact with the button just by looking at it. A lack of visual cues is even more prevalent with the aforesaid in-the-air touchless gesture input systems.

A further issue complicating the operation of the conventional systems is the need for calibration of the user interface component for each user's hand or skin color, or the color of the glove worn by the user of the system, in order to enable reliable hand gesture recognition. The aforesaid calibration requires additional operations to be performed by the users decreasing system's overall usability.

Additional universal challenges facing conventional gesture based user interfaces include avoiding interpreting ordinary gestures and motions of the users that were not intended to constitute input for the computer system. On the other hand, the gestures must be easy and comfortable for the user to perform and, at the same time, be reliably detected by the system. To address these challenges, one exemplary system described in Wilson, A. D., Using a depth camera as a touch sensor, Proc. ITS '10, pp. 69-72 provides a robust way to enter and exit hand tracking states for supporting continuous gesture events. The user interaction style implemented by the aforesaid system is similar to glove input devices for virtual reality.

As would be appreciated by those of skill in the art, in view of the aforesaid deficiencies of the conventional technology, new and improved gesture based user interfaces with improved robustness of gesture detection are needed.

SUMMARY OF THE INVENTION

The embodiments described herein are directed to methods and systems that substantially obviate one or more of the above and other problems associated with conventional methods for implementing user interfaces.

In accordance with one aspect of the inventive concepts described herein, there is provided a computer-implemented method for detecting a gesture performed by a user in connection with a user interface widget comprising a hotspot, the method being performed in a computerized system comprising a central processing unit, a camera and a memory. The inventive method involves: acquiring a plurality of images of the hotspot using the camera; using the central processing unit to identify occlusion of at least a portion of the hotspot by the user in the acquired plurality of images of the hotspot; and using the central processing unit to detect the gesture performed by the user based on the identified occlusion of the at least the portion of the hotspot in at least two of the acquired plurality of images of the hotspot.

In accordance with another aspect of the inventive concepts described herein, there is provided a computer-implemented method for detecting a gesture performed by a user in connection with graphical user interface comprising a widget, the method being performed in a computerized system comprising a central processing unit, a camera and a memory. The inventive method involves: acquiring an image of the user interface using the camera; using the central processing unit to extract a portion of the acquired image corresponding to the widget; determining values associated with a plurality of sensor pixels corresponding to the widget; recording, in the memory, a history of values associated the plurality of sensor pixels corresponding to the widget; and using the central processing unit to determine, based on the recorded history of values associated the plurality of sensor pixels, whether a predetermined pattern associated with the gesture occurred.

In accordance with yet another aspect of the inventive concepts described herein, there is provided a non-transitory computer-readable medium embodying a set of computer-executable instructions, which, when executed in a computerized system comprising a central processing unit, a camera and a memory, cause the computerized system to perform a method for detecting a gesture performed by a user in connection with a widget comprising a hotspot. The method involves: acquiring a plurality of images of the hotspot using the camera; using the central processing unit to identify occlusion of at least a portion of the hotspot by the user in the acquired plurality of images of the hotspot; and using the central processing unit to detect the gesture performed by the user based on the identified occlusion of the at least the portion of the hotspot in at least two of the acquired plurality of images of the hotspot.

In accordance with yet another aspect of the inventive concepts described herein, there is provided a non-transitory computer-readable medium embodying a set of computer-executable instructions, which, when executed in a computerized system comprising a central processing unit, a camera and a memory, cause the computerized system to perform a method for detecting a gesture performed by a user in connection with user interface comprising a widget. The method involves: acquiring an image of the user interface using the camera; using the central processing unit to extract a portion of the acquired image corresponding to the widget; determining values associated with a plurality of sensor pixels corresponding to the widget; recording, in the memory, a history of values associated the plurality of sensor pixels corresponding to the widget; and using the central processing unit to determine, based on the recorded history of values associated the plurality of sensor pixels, whether a predetermined pattern associated with the gesture occurred.

In accordance with yet another aspect of the inventive concepts described herein, there is provided a computerized system comprising: a user interface generation module for causing a user interface to be displayed to a user, the user interface comprising a widget; a camera for acquiring an image of the user interface; an occlusion identification module for identifying occlusion of at least a portion of the widget in the acquiring image of the user interface; and a gesture detection module for detecting a gesture performed by the user based on the identified occlusion of the at least the portion of the widget.

In accordance with yet another aspect of the inventive concepts described herein, there is provided a computerized system comprising: a camera for acquiring an image of the user interface; an extracting module for extracting a portion of the acquired image corresponding to the widget; a determining module for determining values associated with a plurality of sensor pixels corresponding to the widget; a memory for storing a history of values associated the plurality of sensor pixels corresponding to the widget; and a pattern identification module for determining, based on the recorded history of values associated the plurality of sensor pixels, whether a predetermined pattern associated with the gesture occurred.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive concepts. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

To address the above and other problems associated with the conventional technology, one or more embodiments described herein implement approach to gesture interaction that is based on graphical user interface widgets. In particular, it is beneficial to add gesture functionality to widgets in a graphical user interface (GUI), which is a predominant type of user interface for interacting with computers. In one or more embodiments, in order to detect user gestures, the widgets are provided with hotspots that are monitored using a camera for predetermined patterns of occlusion. A hotspot is a region where the user interacts with the widget by making a gesture over it. The occlusion occurs when the user's finger or hand moves to certain positions between the camera and the surface displaying the widget. In one or more embodiments, the user's gesture may be detected without user physically touching the surface displaying the widget.

In one or more embodiments, the aforesaid hotspots are designed to be visually salient and suggestive of the type of gestures that can be received from the user. As would be appreciated by those of skill in the art, the embodiments described herein are advantageous in relation to the conventional systems, such as systems utilizing finger tracking, in that they can better support complex tasks with repeated user actions. In addition, the embodiments described herein provide better perceived affordance than conventional systems that attempt to use widgets that are not designed for gesture input, or in-the-air gesture detection techniques that lack any visual cues.

Figure 1:
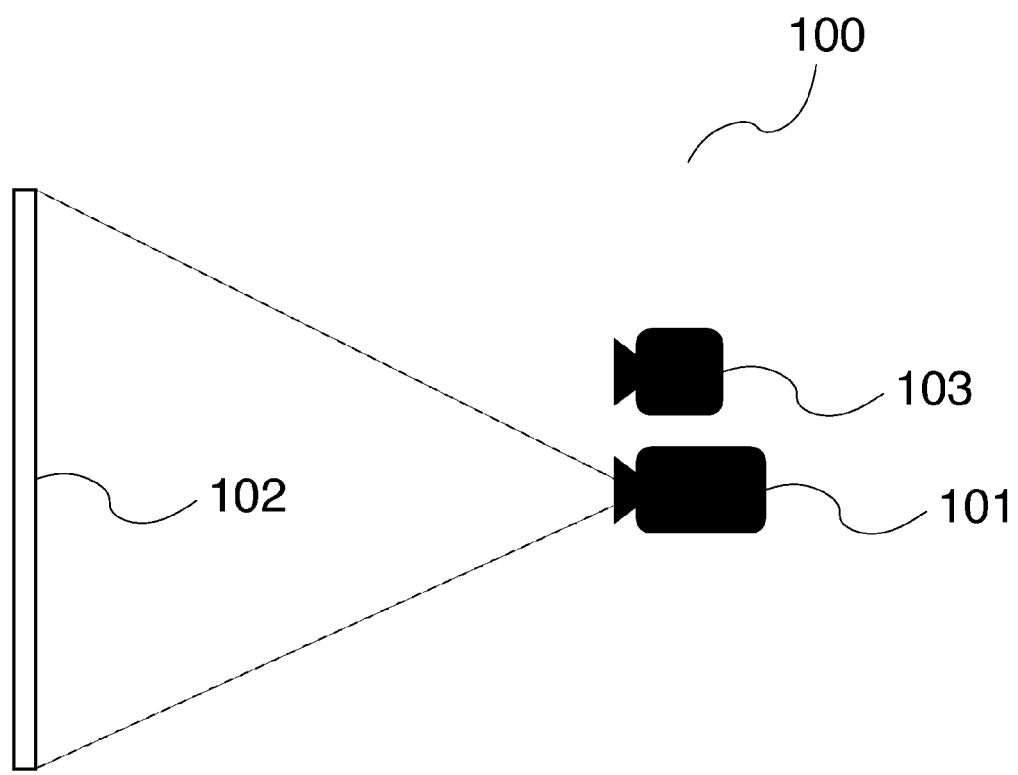
FIG. 1 illustrates an exemplary embodiment of a system for employing user interface widgets for user gesture detection.

FIG. 1 illustrates an exemplary embodiment 100 of a system for employing graphical user interface widgets for user gesture detection. The illustrated embodiment 100 incorporates a projector 101 projecting a representation of a graphical user interface including content and at least one widget on a display surface 102. The camera 103 is positioned to have the display surface 102 within its field of view to acquire the video of the graphical user interface projected on the display surface 102 as well as the gestures performed by the user (not shown) in connection with the displayed widgets. In one or more embodiments, the camera 103 may be positioned adjacent to or in the proximity of the projector 101.

As stated above, the graphical user interface projected by the projector 101 on the display surface 102 may include one or more widgets described in detail below. In one embodiment, the display surface 102 may be a horizontal surface, such as a top surface of a desk or a table. In this configuration, the projector 101 and the camera 103 are mounted above the display surface 102. In another embodiment, the display surface 102 may be vertical. The video acquired by the camera 103 is processed by a video processing module 1818 described in detail bellow in connection with FIG. 18 to detect user's gestures based on occlusion of the portions of the widgets displayed on the display surface 102 by the user. In one embodiment, the user may use his or her finger or fingers to perform the gestures usable in connection with the exemplary embodiment 100 of FIG. 1.

Figure 2:
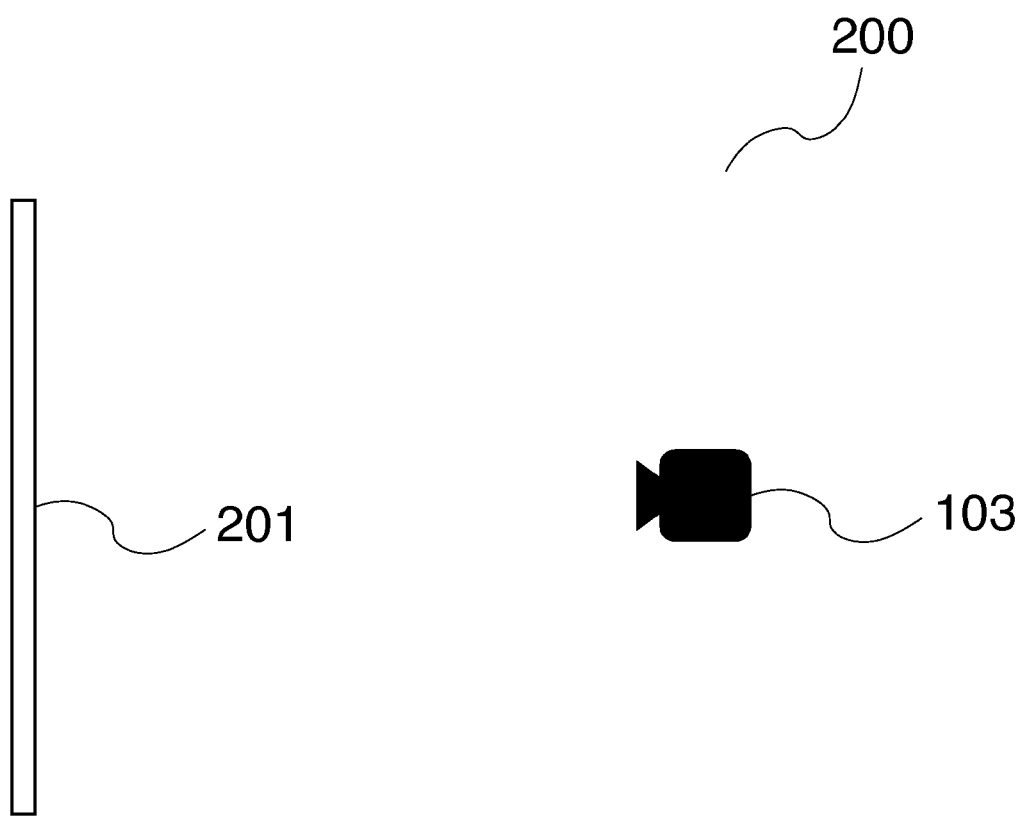
FIG. 2 illustrates another exemplary embodiment of a system for employing user interface widgets for user gesture detection.

FIG. 2 illustrates another exemplary embodiment 200 of a system for employing user interface widgets for user gesture detection. In the embodiment 200, the projector 101 and the display surface 102 of FIG. 1 are replaced with a display panel 201, which displays the graphical user interface on its surface. As in the embodiment 100, the camera 103 is positioned to have the display panel 201 within its field of view to acquire the video of the graphical user interface displayed by the display panel 201 as well as the gestures performed by the user (not shown).

In yet alternative embodiment, the widget may be permanently printed on a flat surface, such as on a piece of paper or any other object or medium. In this embodiment, the camera 103 will be positioned to have the paper with the printed widget within its field of view to acquire the video of the widget as well as the gestures performed by the user in connection with the printed widget. It should be noted that the inventive concepts described herein are not limited by any specific medium displaying or embodying the widgets usable in connection with detection of user gestures. Any system that would provide information on dynamic occlusion of the projected, displayed or printed widgets by user's body parts could be usable for implementing the described gesture detection functionality.

Figure 3:
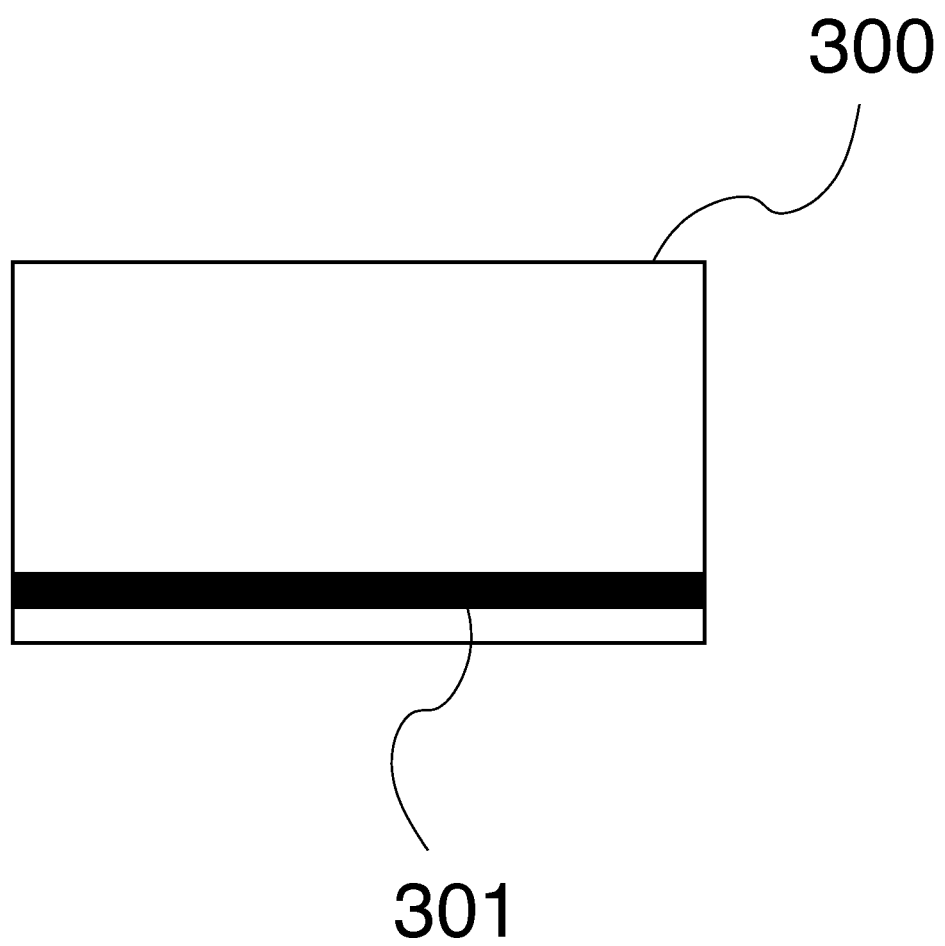
FIG. 3 illustrates an exemplary embodiment of a widget usable for user gesture detection.

FIG. 3 illustrates an exemplary embodiment of a widget 300 usable for user gesture detection. In one or more embodiments, the widget 300 incorporates a hotspot implemented in a form of a stripe 301, which is used for gesture detection and also suggests to the user that the widget can receive a swiping gesture. In one or more embodiments, the stripe 301 is analogous to a credit card stripe. On one embodiment, the color of the stripe 301 may be black or any other dark color. In one embodiment, the length of the stripe is larger than the width of the user's finger, such that when the user swipes his finger over the stipe 301, at least a portion thereof is not occluded by the user's finger. Another criterion is that the occluded portion breaks up the hotspot into two discontiguous unoccluded portions. In contrast, a person's hand or body or other large object will not satisfy this criterion at any point in time as it moves pass the widget. This feature of the widget 300 may be used by the video processing module 1818 to increase robustness of the gesture detection, as described in detail below. For example, unintentional swiping by a hand or other body part of the user will not lead to detection of a false gesture.

In one or more embodiments, for a valid gesture to be detected, a ratio of a size of a proportion of the hotspot that is occluded to a size of the remaining portion of the hotspot that is not occluded should be within a predetermined range. The predetermined range of the aforesaid ratio values can be determined using, for example, the entire size (length) of the hotspot in relation to the typical size (width) of the expected occluding object, such as a finger. In one or more embodiments, the predetermined range of the aforesaid ratio can be between 15% and 75%. In other words, the width of the occluding object can be between 15% and 75% of the length of the entire hotspot.

In one or more embodiments, the widget 300 may incorporate an additional information object providing guidance to the user on the manner of using the widget. In one embodiment, the aforesaid information object may comprise an animation illustrating the gesture usable in connection with the widget. In one or more embodiment, the animation may be activated and played to the user when the video processing module 1818 detects the user performing a hold gesture over the displayed widget. In one or more embodiments, the information object may indicate to the user the direction of the swipe gesture.

Figure 4:
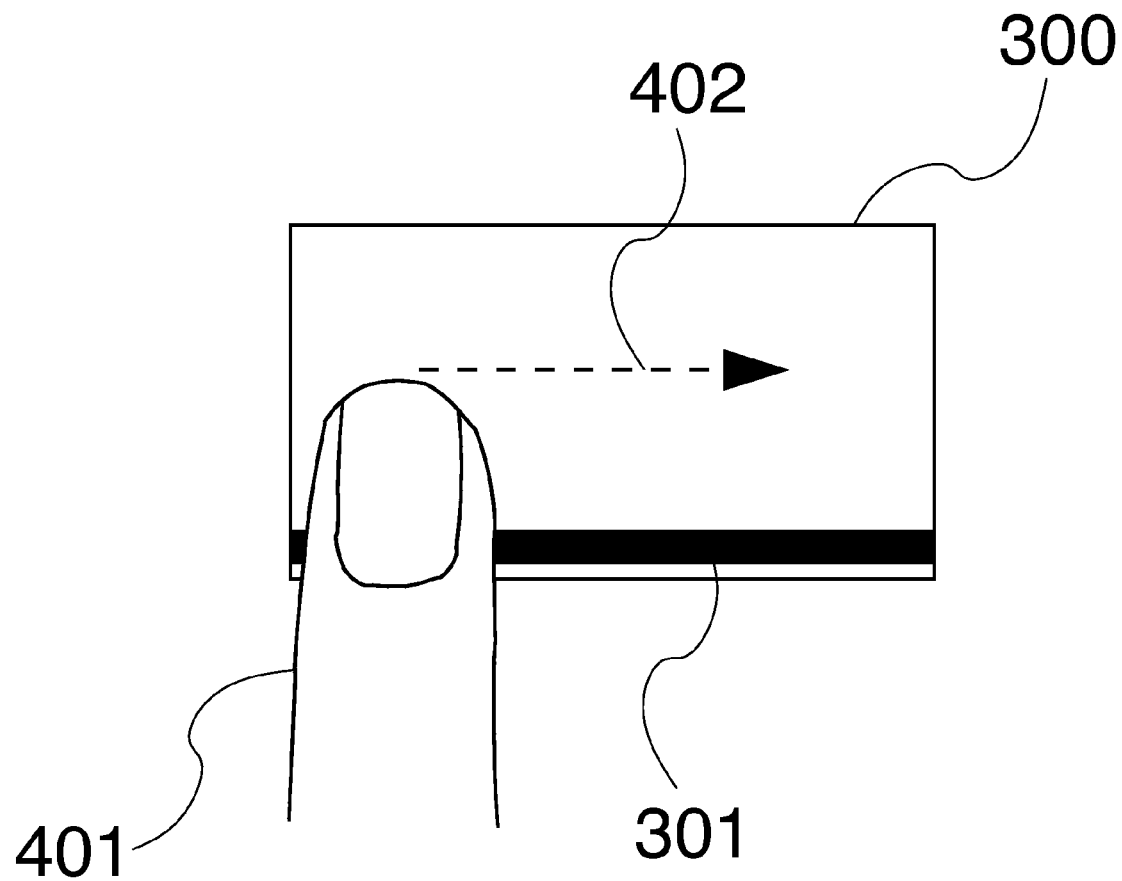
FIG. 4 illustrates an exemplary user gesture usable in connection with the widget illustrated in FIG. 3.

FIG. 4 illustrates an exemplary user gesture usable in connection with the widget 300 illustrated in FIG. 3. Specifically, user swipes his finger 401 from left to right as indicated by the directional arrow 401 over the stipe 301 of the widget 300. As shown in FIG. 3, at all times, only a portion of the stripe 301 is occluded by the user's finger 401. The video of this gesture is acquired by the camera 103 and processed by the video processing module 1818. The gesture is detected based on dynamic occlusion of the portions of the stripe 301 by the user's finger 401. In response to the detected gesture, a corresponding command is performed.

Figure 5:
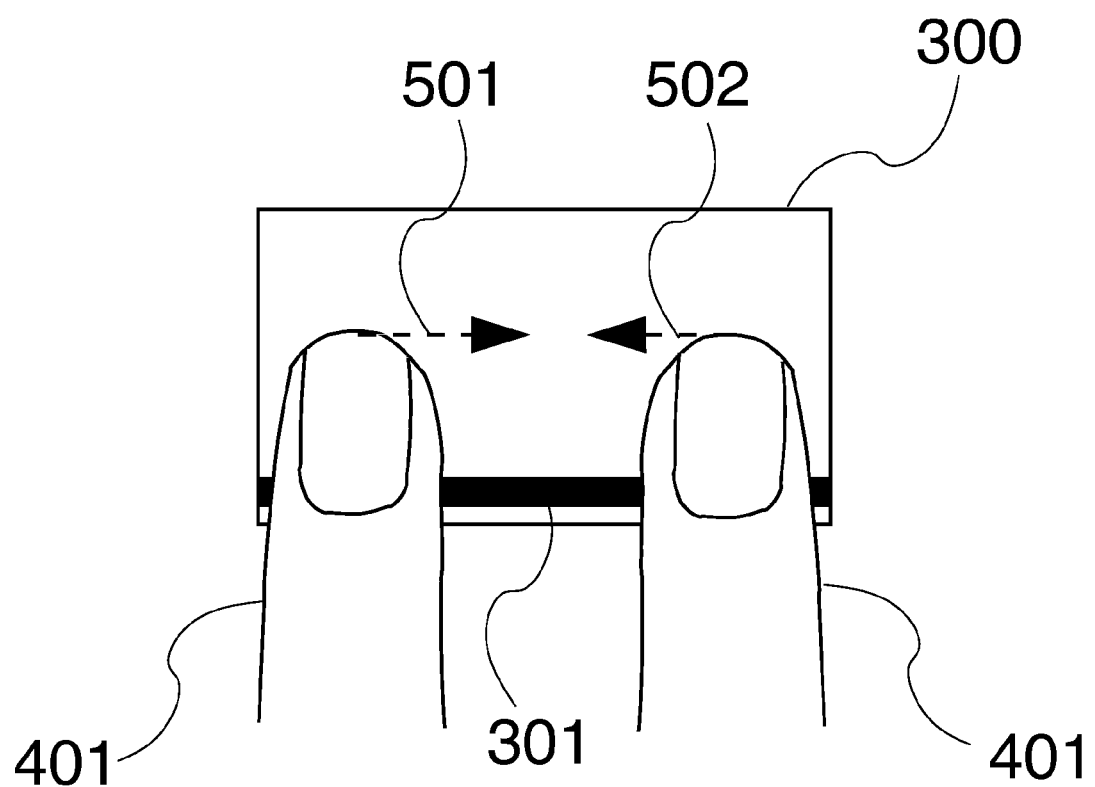
FIG. 5 illustrates another exemplary user gesture usable in connection with the widget illustrated in FIG. 3.

FIG. 5 illustrates another exemplary user gesture usable in connection with the widget 300 illustrated in FIG. 3. Specifically, the gesture illustrated in FIG. 5 is a pinch-like gesture performed over the stripe 301 by user's two fingers 401 traveling towards each other as indicated by directional arrows 501 and 502. It should be noted that, in one embodiment, even with two-finger gestures, at least a portion of the stripe 301 is not occluded at any given time. The gesture illustrated in FIG. 5 is detected based on dynamic occlusion of the portions of the stripe 301 by the user's two fingers 401.

Figure 6:
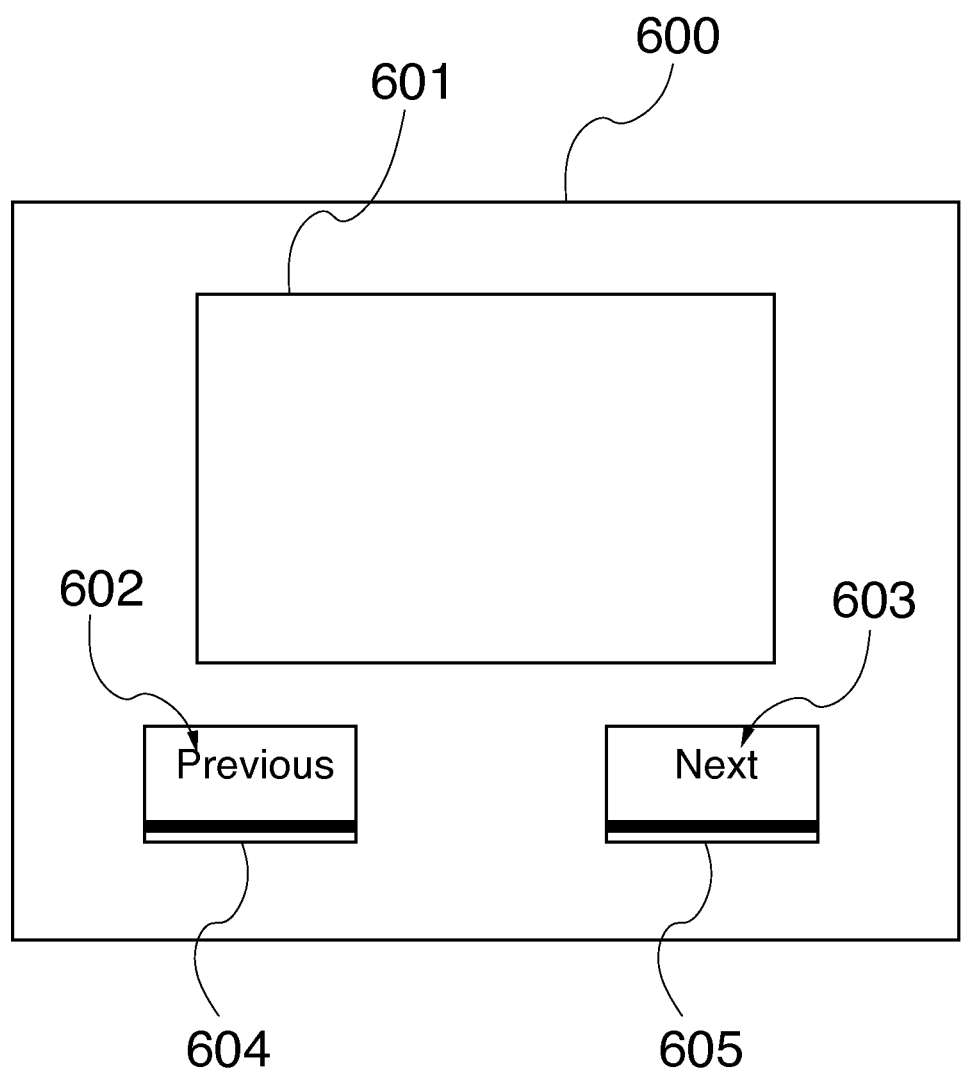
FIG. 6 illustrates an exemplary embodiment of a user interface incorporating two widgets.

FIG. 6 illustrates an exemplary embodiment 600 of a user interface incorporating two widgets 604 and 605. In the shown embodiment the user interface 600 incorporates a content portion 601. In one embodiment, the content portion 601 may incorporate various content, such a presentation slide in a slideshow. In one or more embodiments, the content displayed in the content portion 601 is controlled by the user using the gestures performed in connection with the two widgets 604 and 605. Specifically, to advance the presentation to the next slide, the user may swipe his finger over the widget 605. The user's swipe is detected by the video processing module 1818 and, responsive thereto, the next slide is displayed in the content portion 601. To inform the user of the action performed by the system responsive to the user's gesture in connection with the specific widget 605, information portion 603 of said widget may display word "Next." Likewise, to go back to the previous slide, the user may perform a swipe gesture over the widget 604 marked with word "Previous" see element 602. It should be noted that the user interfaces incorporating the widgets described herein are not limited to slide or presentation viewers. Any types of user interfaces incorporating any content may be controlled using the described techniques.

Figure 7:
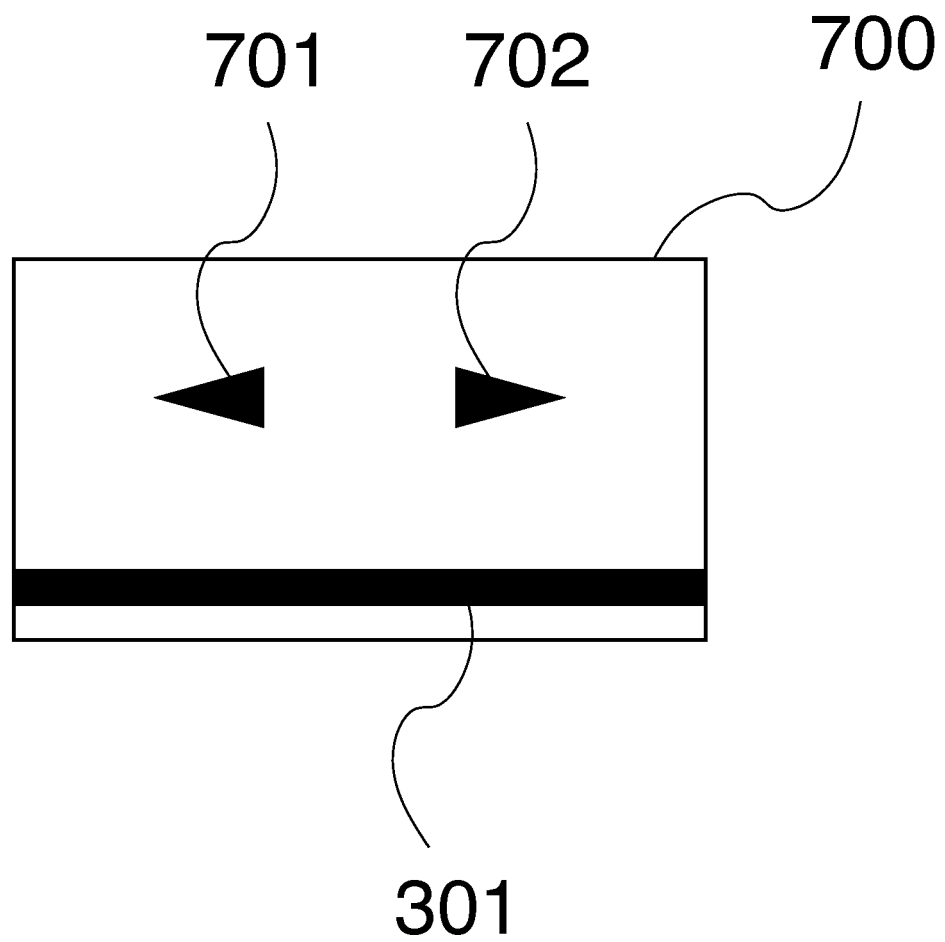
FIG. 7 illustrates an exemplary embodiment of a widget usable for detecting two-directional gestures.

In one or more embodiments, instead of using two widgets 604 and 605, the video processing module 1818 may be configured to detect the direction of the swipe gesture over the widget. FIG. 7 illustrates an exemplary embodiment of a widget 700 usable for detecting two-directional gestures. The widget 700 incorporates two information objects in a form of two directions arrows 701 and 702 indicating to the user that swipes in both directions will be accepted by the system. The widget 700 may be incorporated, for example into the exemplary embodiment 600 of a user interface shown in FIG. 6. In this case, the detected direction of the user's gesture will cause the next or the previous slide to be shown in the content portion 601. For example, the detected left-to-right gesture will cause the next slide to be presented, while the detected right-to-left gesture will cause the displaying of the previous slide.

In one or more embodiments, the widget 700 may be used as a slider widget, where the position of the finger occlusion along the stripe 301 detected by the video processing module 1818 is used to determine appropriate action. This type of widget may be used for example for adjusting scale of content displayed the content portion 601. In one embodiment, the slider widget is used for navigating within video content shown in the content portion 601.

Figure 8:
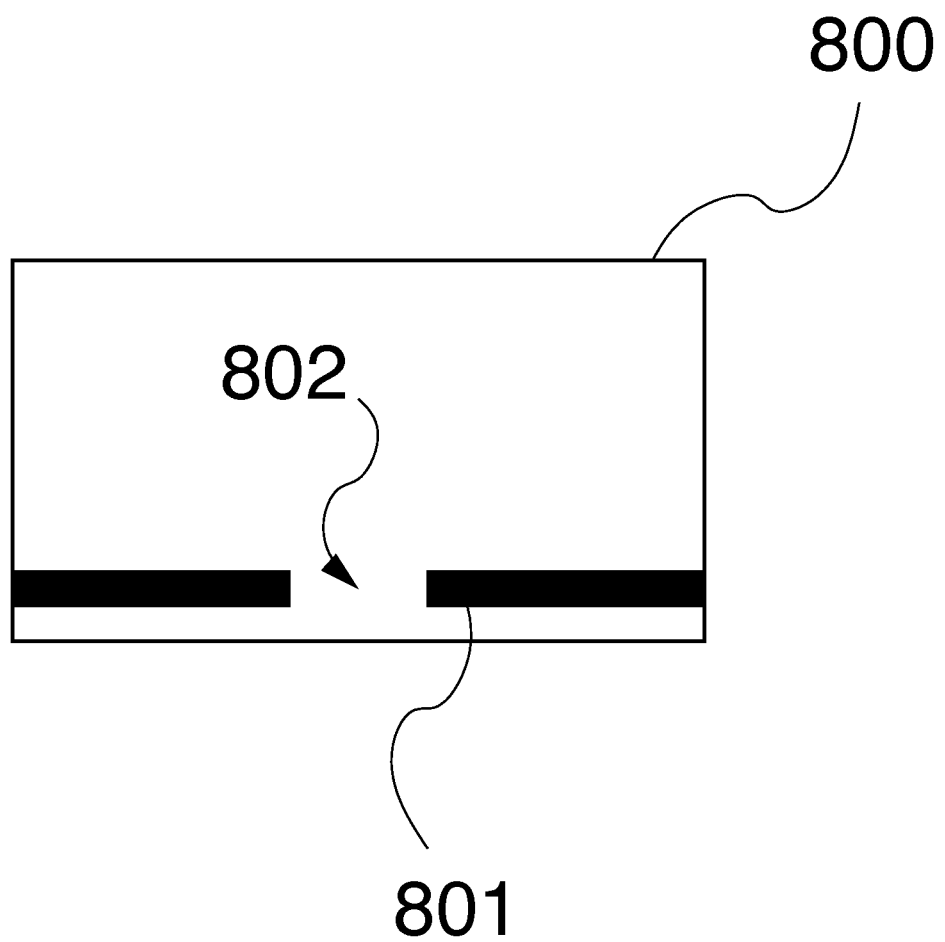
FIG. 8 illustrates another exemplary embodiment of a widget usable for user gesture detection.

FIG. 8 illustrates another exemplary embodiment of a widget 800 usable for user gesture detection. In the widget embodiment 800, the stripe 801 comprises an empty slot 802 in the middle of the stripe. This widget is configured to work with "fill" gesture, wherein the user holds his finger such as to occlude the aforesaid empty slot 802 for a short period of time, which, in various embodiments, could be as short as 10-20 milliseconds. The video processing module 1818 is configured to detect the user gesture based on the empty slot occlusion in the video signal received from the camera 103.

Figure 9:
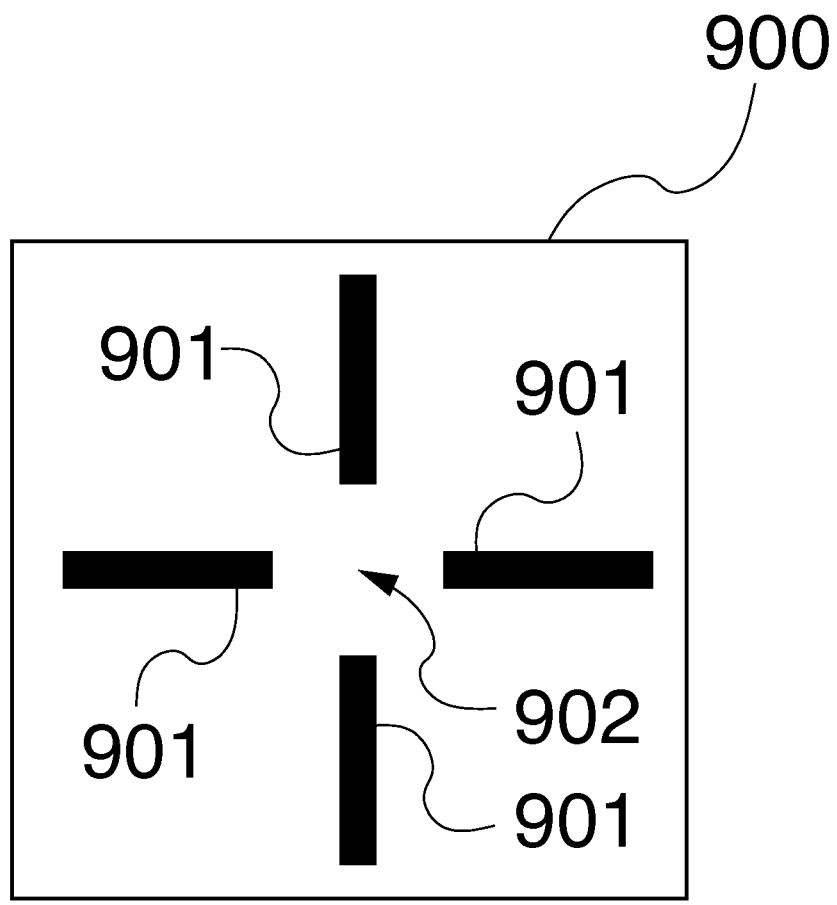
FIG. 9 illustrates yet another exemplary embodiment of a widget usable for user gesture detection.

FIG. 9 illustrates yet another exemplary embodiment of a widget 900 usable for user gesture detection. The widget embodiment 900 comprises crosshair 901 having an empty center 902. Similar to the widget 800, the widget 900 is also configured to work with "fill" gesture, wherein the user holds his finger such as to occlude the aforesaid empty center 902 for a short period of time, which, in various embodiments, could be as short as 10-20 milliseconds. The video processing module 1818 is configured to detect the user gesture based on the empty center occlusion in the video signal received from the camera 103. It should be noted that in various embodiments, the gesture detection using the widget 900 may be more robust than using the widget 800 because the former contains more graphical elements, which may be sued for constraint enforcement. For example, the video processing module 1818 may be configured to record the gesture detection event only if three out of the four bars 901 are not entirely occluded by the user.

Figure 10:
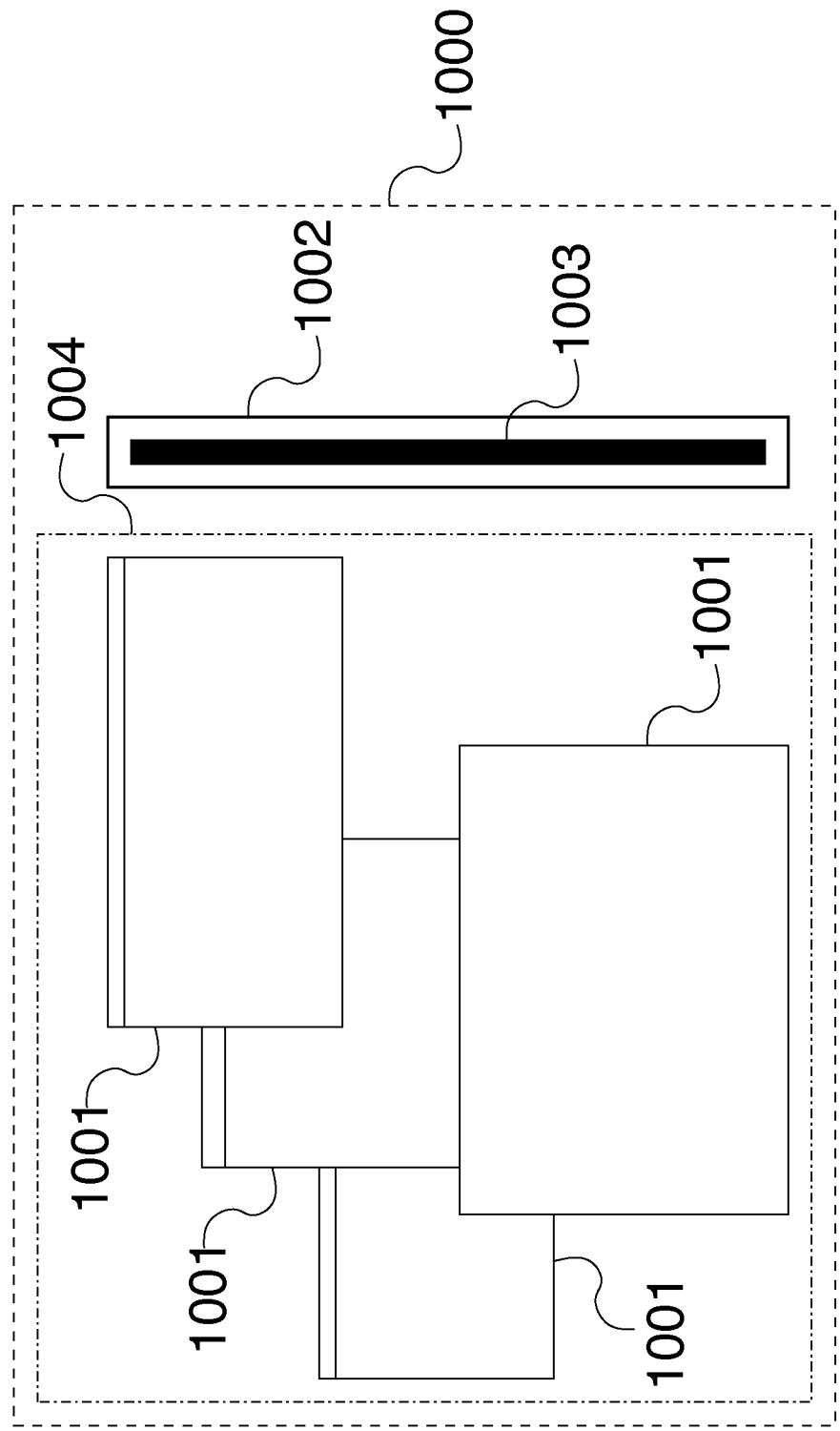
FIG. 10 illustrates an exemplary embodiment of user interface incorporating a widget usable for user gesture detection.

FIG. 10 illustrates an exemplary embodiment of user interface 1000 incorporating a widget 1001 usable for user gesture detection. In one or more embodiment, the user interface 1000 is projected on a wall using the projector 101. As shown in FIG. 10, the user interface 1000 incorporates a desktop portion 1004 containing multiple application windows 1001, such as application windows of a desktop operating system. The user interface 1000 additionally includes widget 1002 with a vertical stripe 1003. Then the user swipes with his hand over the stripe 1003, the video processing module 1818 detects user's gesture and generates an appropriate command. For example, the user interface 1000 could be used in connection with a "window blinds" application to cover up the contents of the user's desktop, image of which is projected on a screen, when an unauthorized person enters the room. When the user swipes his hand over the stripe 1003, the video processing module 1818 sends an event to the operating system and the contents on the projected operating system desktop area are covered up. In one or more embodiments, the next detected swipe causes the previously covered content to be re-displayed.

Similar to the embodiment shown in FIG. 3 above, the stripe 1003 is longer than the size of the user's hand or arm, and at least some portion of the stripe 1003 must not be occluded by user's hand or arm to produce a valid gesture. It should be also noted that the user gestures used in connection with the widget 1002 are vertical, which improves robustness of the gesture detection, as vertical motion is easily distinguishable from mostly horizontal movements of people in the room.

It should be noted that the techniques described herein are not limited to the specific widgets illustrates hereinabove and many other widgets designs are possible without departing from the scope and spirit of the invention. Specifically, in one or more embodiments, the widgets may contain any graphical elements that are visually salient to both the user and the camera. In various embodiments, the widgets are visually suggestive with respect to the type of the user gesture that can be received and processed in connection therewith.

The methods for user gesture detection usable in connection with the aforesaid graphical user interface widgets will now be described. In various embodiments, the user's gestures may be detected, for example, by directly identifying the gesture motion based on the changes in pixel values using brute force, using a finite state machine (FSM), or using a hidden Markov model (HMM).

Figure 11:
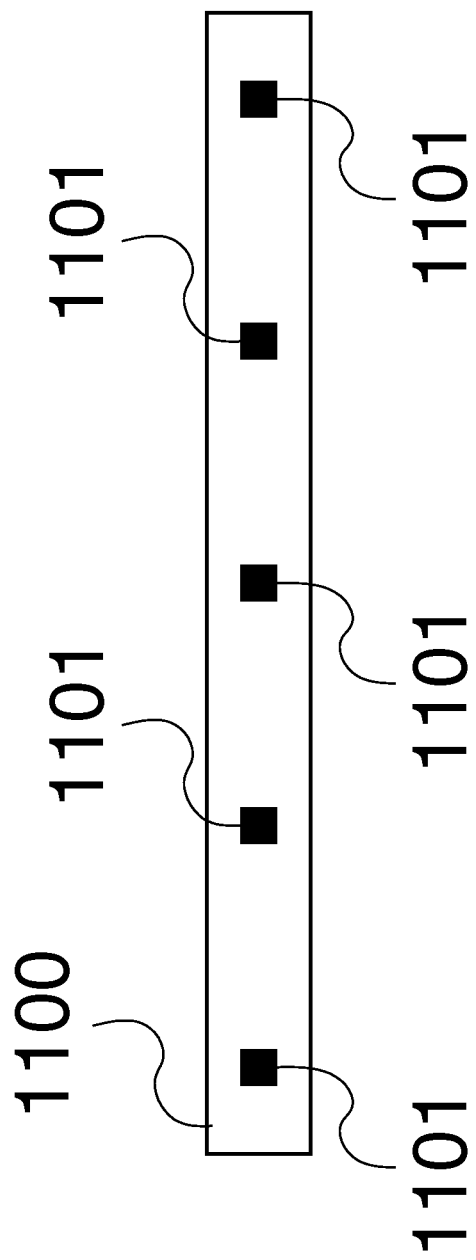
FIG. 11 illustrates an embodiment of a widget's hotspot in the form of a stripe and five sensor pixels therein that are being monitored by the video processing module.

In one or more embodiments, for simple gestures, the video processing module 1818 is configured to directly identify gesture motion changes in the pixel values of the hotspots. To reduce the required computation time (because many frames need to be processed per second) the video processing module 1818 may be programmed to monitor only a few pixels called sensor pixels. For example, sensor pixels may be placed evenly distributed along one or more line segments inside the hotspot. This is illustrated in FIG. 11, which shows an embodiment of a widget's hotspot 1100 in the form of a stripe and five sensor pixels 1101 therein that are being monitored by the video processing module 1818. In one or more embodiments, the video camera images are processed by the video processing module 1818 as they are captured by the camera 103 and the values of the pixels (in world image coordinates) corresponding to the sensor pixels 1101 (in logical coordinates) are recorded to the widget hotspot object. Each sensor pixel record of the widget hotspot object is configured to store a history of the sensed sensor pixel color values. In one embodiment, the video acquired by the camera 103 has a resolution of 640×480 pixels and a frame rate of up to 30 fps.

While the embodiment illustrated in FIG. 11 incorporates five sensor pixels, it should be noted that the invention is not limited to this number or any other number of the sensor pixels. In one or more embodiments, the number of sensor pixels is less than 10. In one or more embodiments, the number of sensor pixels may be determined based on the computing power available for gesture detection. In one or more embodiments, the aforesaid sensor pixels may be evenly or substantially evenly distributed along the widget hotspot. In various embodiments, the sensor pixels may be arranged in a vertical or a horizontal pattern (arrangement). Specifically, the direction of sensor pixel alignment may be the direction of the normal (expected) motion of the occluding object (finger), which is to be detected. On the other hand, the pixels may be arranged in a pattern substantially perpendicular to the direction of motion of an object, which motion is not to be detected.

Figure 12:
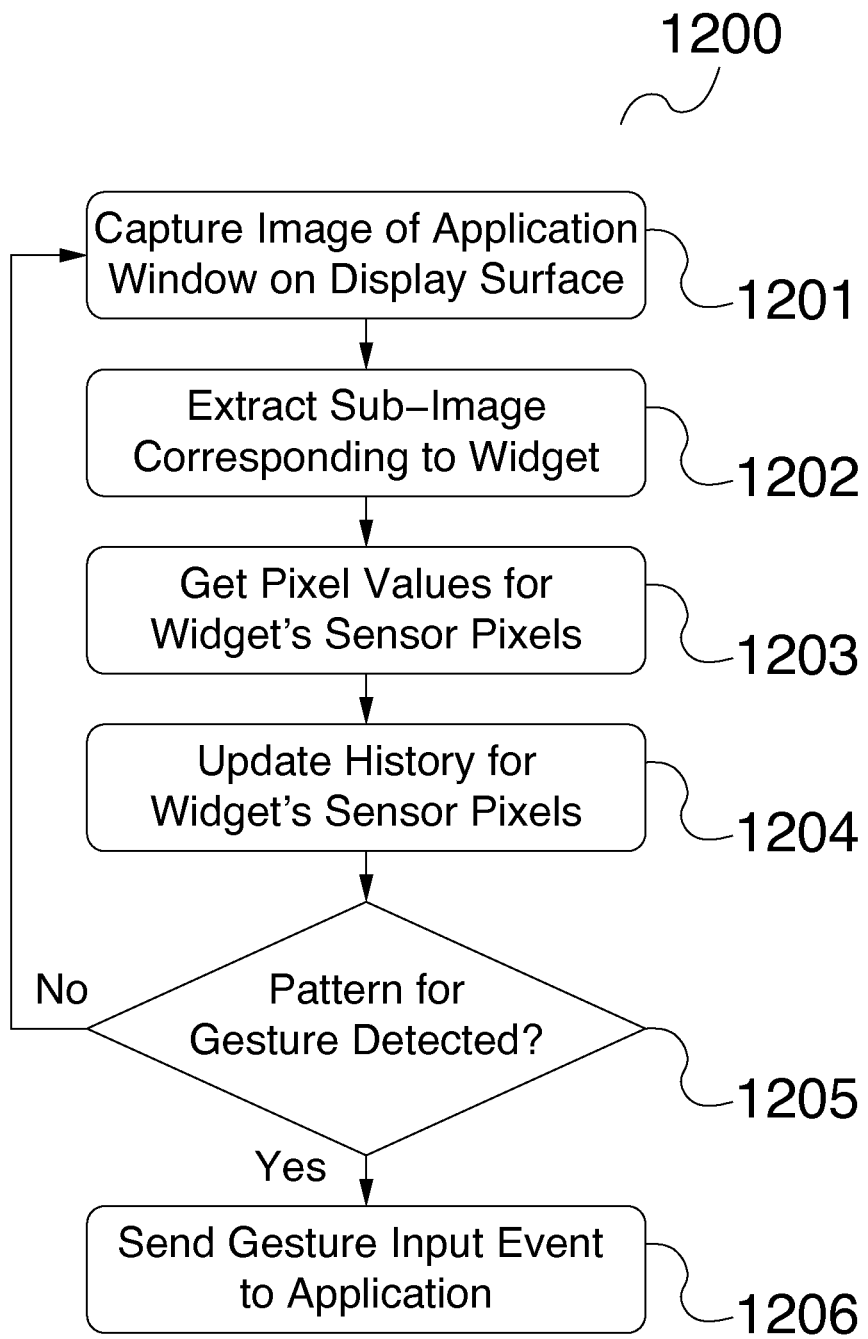
FIG. 12 illustrates an exemplary embodiment of an operating sequence of a process for user gesture detection.

FIG. 12 illustrates an exemplary embodiment of an operating sequence 1200 of a process for user gesture detection. At step 1201, an image or multiple images of the user interface displayed or projected onto a display surface is captured by the camera 103. The aforesaid user interface incorporates at least one widget usable for detecting user gestures. At step 1202, the video processing module 1818 extracts a portion of the captured image corresponding to the aforesaid widget or multiple widgets. At step 1203, the video processing module 1818 obtains pixel color values for widget(s) sensor pixels 1101 illustrated in FIG. 10. At step 1204, the history of widget's sensor pixel color values is updated in the corresponding widget hotspot object.

As will be appreciated by those of skill in the art, in the hotspot's normal state in which the user's finger or hand is not occluding any part of the hotspot, the detected color values of the five sensor pixels 1101 are nearly the same as the background color. When a swipe gesture occurs, the sensor pixels' histories stored in the widget hotspot object will reveal abnormal values at one sensor pixel 1101 after another in sequence over time. The direction of the swipe gesture is also revealed by the direction of the sequence of abnormal pixel color values.

It should be also noted that because the rate of the swipe gesture motion tends to be fairly constant (little speeding up or slowing down), in one embodiment, it may not be necessary to compensate for changes in this speed. However, the aforesaid rate can vary depending on the individual user or the size of the hotspot. To compensate for this variation, the aforesaid sensor pixel history keeps track of the number of successively repeated abnormal values. In one embodiment, the number of repetitions must be the same (within a predetermined threshold) for all the sensor pixels 1101 in order for the video processing module 1818 to determine that a potentially valid gesture has occurred. In one or more embodiments, the video processing module 1818 is configured to determine the speed of the gesture and issue at least one command or alter command parameters based on the determined gesture speed.

In one or more embodiments, for gestures such as the swipe gesture, one possible simplification of the gesture detection is to subsample the sensor pixels when detecting the gesture patterns. The computation time is reduced when using fewer sampled pixels because the size of the set of possible input values grows exponentially with the number of sampled pixels. However, all the sensor pixels values can still be taken into account when computing the background color. In the case of five sensor pixels 1101 subsampled every two pixels, the video processing module 1818 must check only three pixels for the abnormal values (the left, middle, and right pixels). Let 0 denote the background value, and 1 denote an abnormal value that differ from the background by some threshold. Then a pattern sequence of the aforesaid three subsampled pixels over successive video frames such as {100, 010, 001} would indicate that a swipe gesture from left-to-right has occurred.

Turning back to the process 1200 of FIG. 12, at step 1205, the video processing module 1818 checks the stored history of the three subsampled widget's sensor pixel color values to detect the aforesaid pattern sequence, such as {100, 010, 001} or {001, 010, 100}. Once the appropriate pattern sequence has been detected, the parameters of the identified gesture are devised and the gesture input event is generated, see step 1206 in FIG. 12. If the requisite pattern sequence is not detected, new frames continue to be acquired by the camera 103 at step 1201. This technique is called the brute force method.

In an alternative embodiment, a finite state machine (FSM) method may be used. The finite state machine method does not need to look back at the previous inputs and is more efficient than the aforesaid brute force method. The finite state machine method is well know in the art and described, for example, in Cormen, T., Leiserson, C., Rivest, R., Stein, C. Introduction to Algorithms, 2nd ed., 2001, MIT Press.

Figure 13:
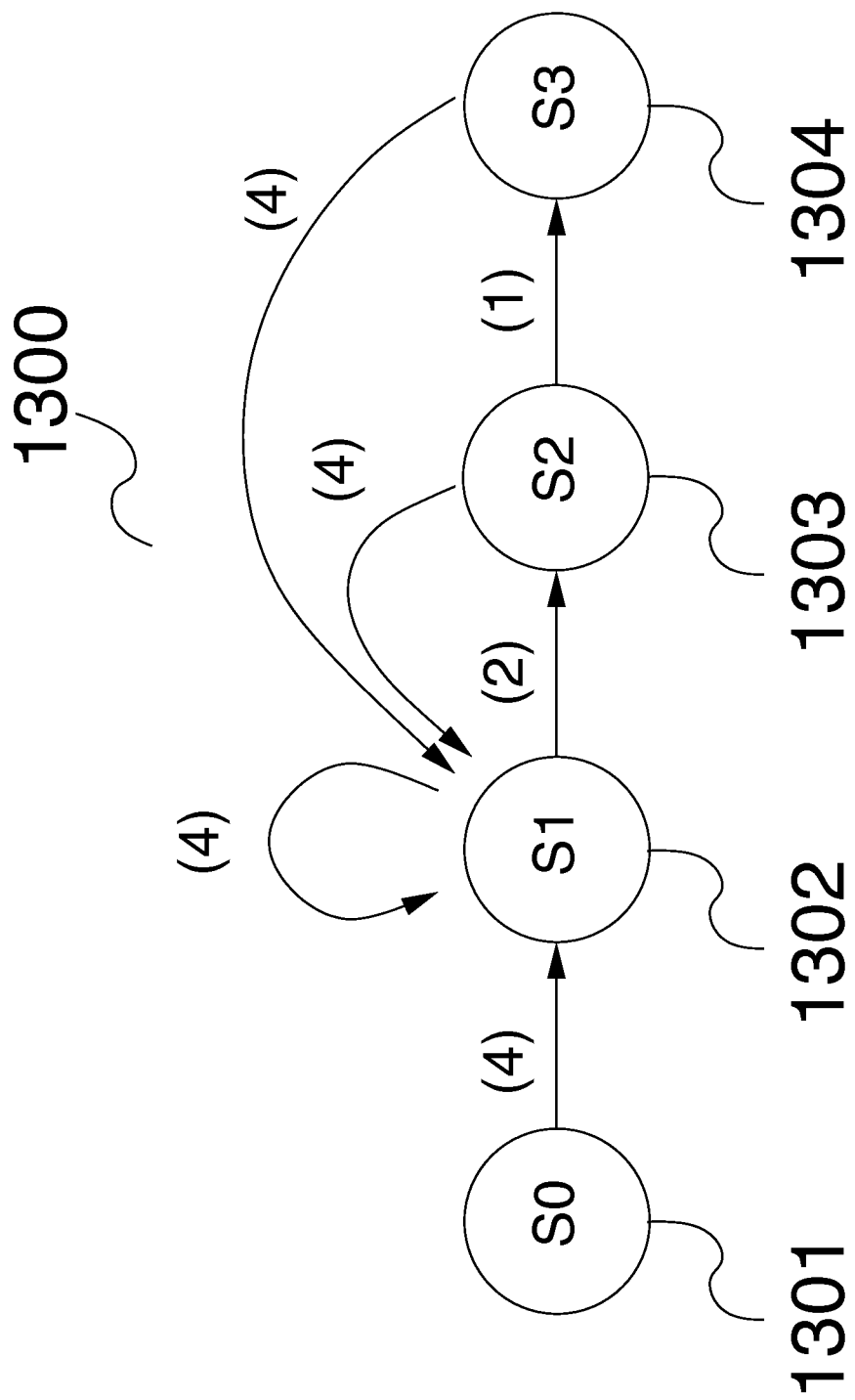
FIG. 13 illustrates an exemplary embodiment of a state transition diagram for detecting user gestures.

For each sequence pattern, a finite state machine is defined by a state transition diagram or table. In one or more embodiments, with three subsampled sensor pixels 1101, there are eight possible inputs {000, 001, 010, 011, . . . , 111}, which can be interpreted as binary numbers {0, 1, 2, 3, . . . , 7}. The exemplary embodiment of the state transition diagram 1300 for the sequences {100, 010, 001} or {4, 2, 1} is shown in FIG. 13. The state transition diagram 1300 includes four states {S0, S1, S2, 53}, designated by numerals 1301, 1302, 1303 and 1304, respectively, and the input values are shown in parentheses. To avoid clutter in the diagram 1300 of FIG. 13, if an input value is not shown by an arrow coming out of a state, it means that the transition is to state S0 1301. Whenever the state S3 1303 is reached, the pattern {4, 2, 1} has been detected.

Figure 14:
FIG. 14 illustrates an exemplary embodiment of a state transition table for detecting user gestures equivalent to the state transition diagram of FIG. 13.

In one or more embodiments, the state transition diagram 1300 is implemented in the video processing module 1818 using an equivalent state transition table 1400 shown in FIG. 14. The numbers in the table cells refer to the new state given the current state and the new input. For example, if the current state is S1 and the new input value is (2), then the new state will be state 2 or S2. It should be noted that the gesture detection algorithms usable in connection with the described widgets are not limited to the described brute force and finite state machine methods and any other suitable algorithms for detecting gestures may likewise be employed without departing from the spirit and scope of the invention.

In one or more embodiments, to facilitate robust gesture detection by the video processing module 1818, a calibration mode can be provided. The purpose of the calibration is to properly configure the video processing module 1818 to perform transformations from the video image coordinates to the widget's logical coordinates. The calibration method is implemented in a calibration module 1819.

In one or more embodiments, if the graphical user interface of the user application incorporates multiple widgets, the calibration module 1819 is configured to cycle through the widgets one at a time. To calibrate each widget, the calibration module 1819 is configured to cause the appearance of the respective widget to be changed for a predetermined period of time. In various embodiments, the aforesaid predetermined amount of time may be as short as 200 milliseconds. In one or more embodiments, the appearance of each widget may be sequentially changed to each of a predetermined set of appearances. The calibration module 1819 is configured to subsequently analyze the images of the widget acquired by the camera 103 and compare the differences between said acquired images corresponding to each widget appearance. Using this technique, the locations of the borders and hotspots of the widgets are determined.

Figure 15:
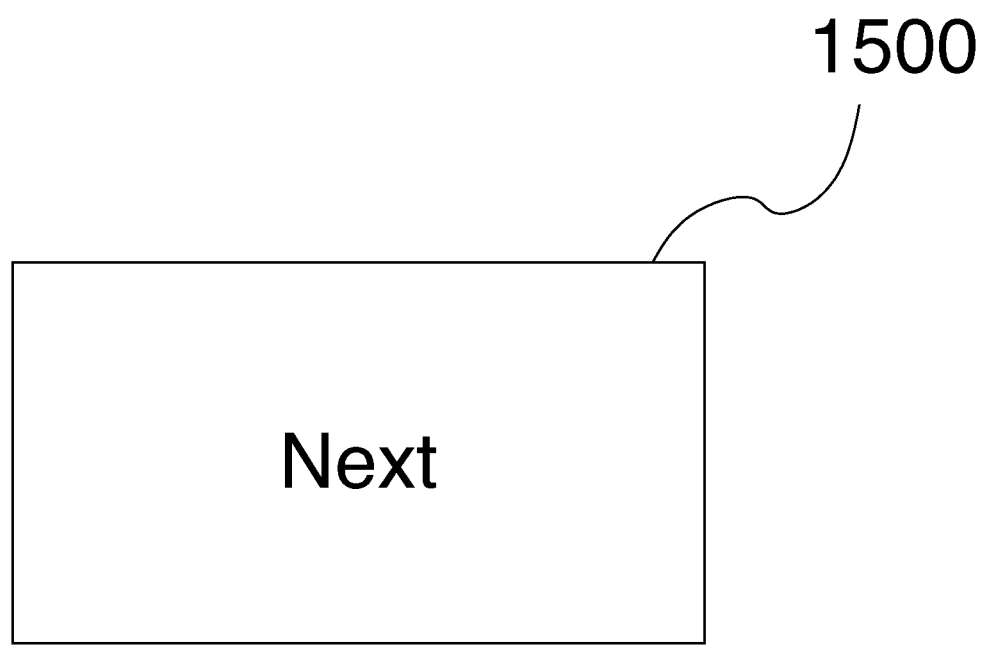
FIGS. 15, 16 and 17 show three exemplary calibration appearances of the "Next" button widget, which is used, for example, in connection with the user interface shown in FIG. 6.
Figure 16:
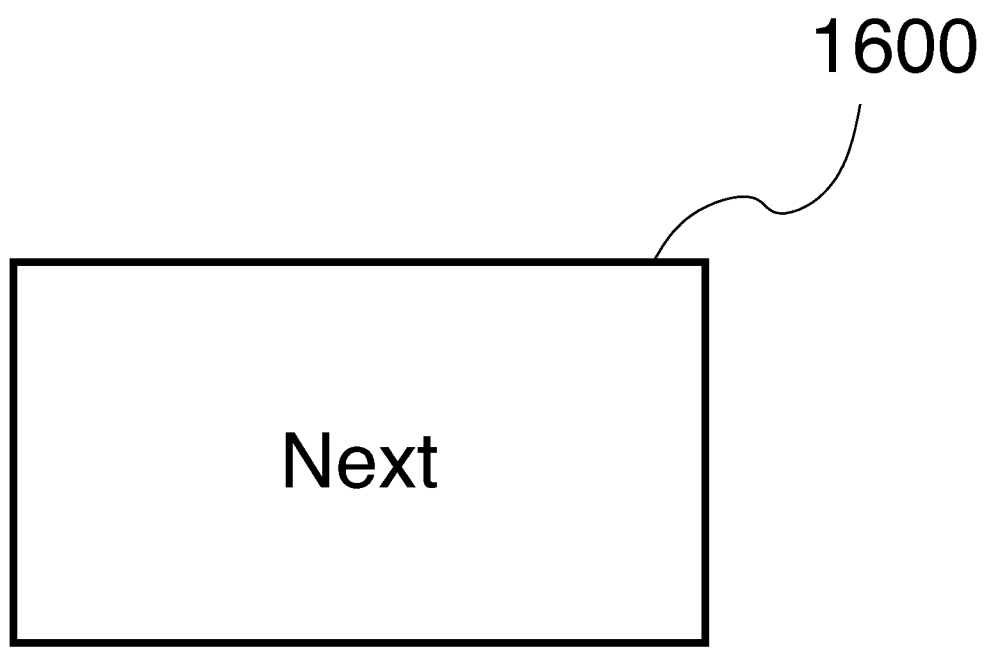
Figure 17:
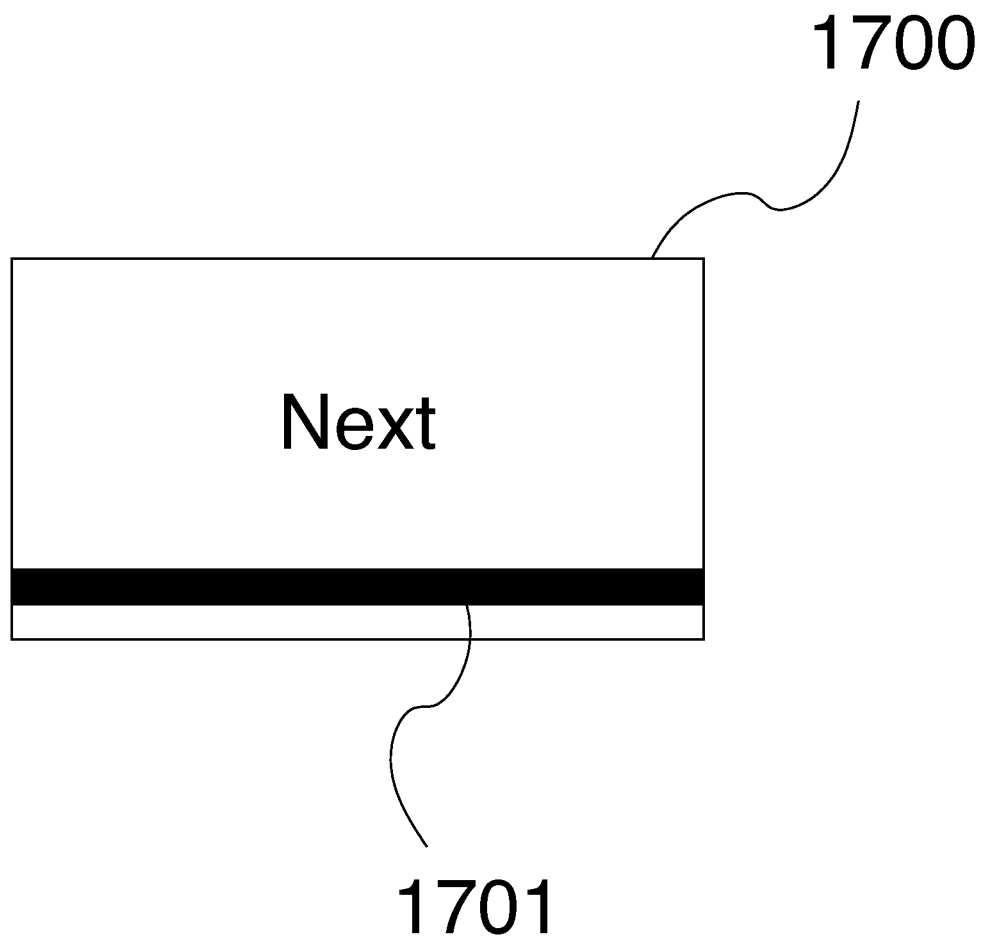

FIGS. 15, 16 and 17 show three different exemplary appearances of the "Next" button widget, which is used, for example, in connection with the user interface 600 shown in FIG. 6. The shown different appearances of the widget are utilized by the calibration module 1819 for calibration purposes. For example, in one or more embodiments, the calibration module 1819 is configured to detect the border of the widget by comparing the image of the borderless widget 1500 shown in FIG. 15 with the image of the widget 1600 with a border shown in FIG. 16. In addition, the hotspot stripe 1701 of the widget may be detected by comparing the image of the stripe-less widget 1500 shown in FIG. 15 with the image of the widget 1700 having a stripe 1701 as shown in FIG. 17. The detected widget primitives (border and hotspot) are used by the calibration module 1819 to devise calibration data in a form of a transformation formula or table for transforming the video image coordinates to the widget's logical coordinates, which are stored for the subsequent use by the video processing module 1818.

It should be noted that in many widget frameworks, the widget objects can be nested hierarchically with children widgets being placed inside parent widgets. If the parent widget has information about the layout of its children widgets, only the parent widget needs to be calibrated thereby making the calibration more efficient. However, if the projection display surface is not flat, calibrating the children widgets can produce more accurate results.

While one or more of the described embodiments of the gesture detection technique rely on monitoring the hotspots on the widgets for dynamic occlusion patterns, other technologies may be used in conjunction with the described embodiments to improve the robustness of gesture detection. For example, in one or more embodiments, finger and hand tracking technologies can be added to occlusion pattern detection if the use scenario only calls for the user gesturing with the hand and not with other objects, like a stylus. In the same or other embodiments, depth cameras can be added to limit the gesturing hand's distance to the surface to prevent false gesture detection.

Because in one or more of the described embodiments all the hotspots are monitored simultaneously, the video processing module 1818 may be configured to support chording operations that involve activating several widget hotspots together. It should be also noted that the video processing module 1818 is configurable to detect more complicated dynamic occlusion patterns within a single hotspot or multiple hotspots, that may represent a wide variety of single- and multi-touch user gestures. Thus, the inventive techniques are not limited to detecting only the described user gestures and the corresponding dynamic occlusion patterns.

Figure 18:
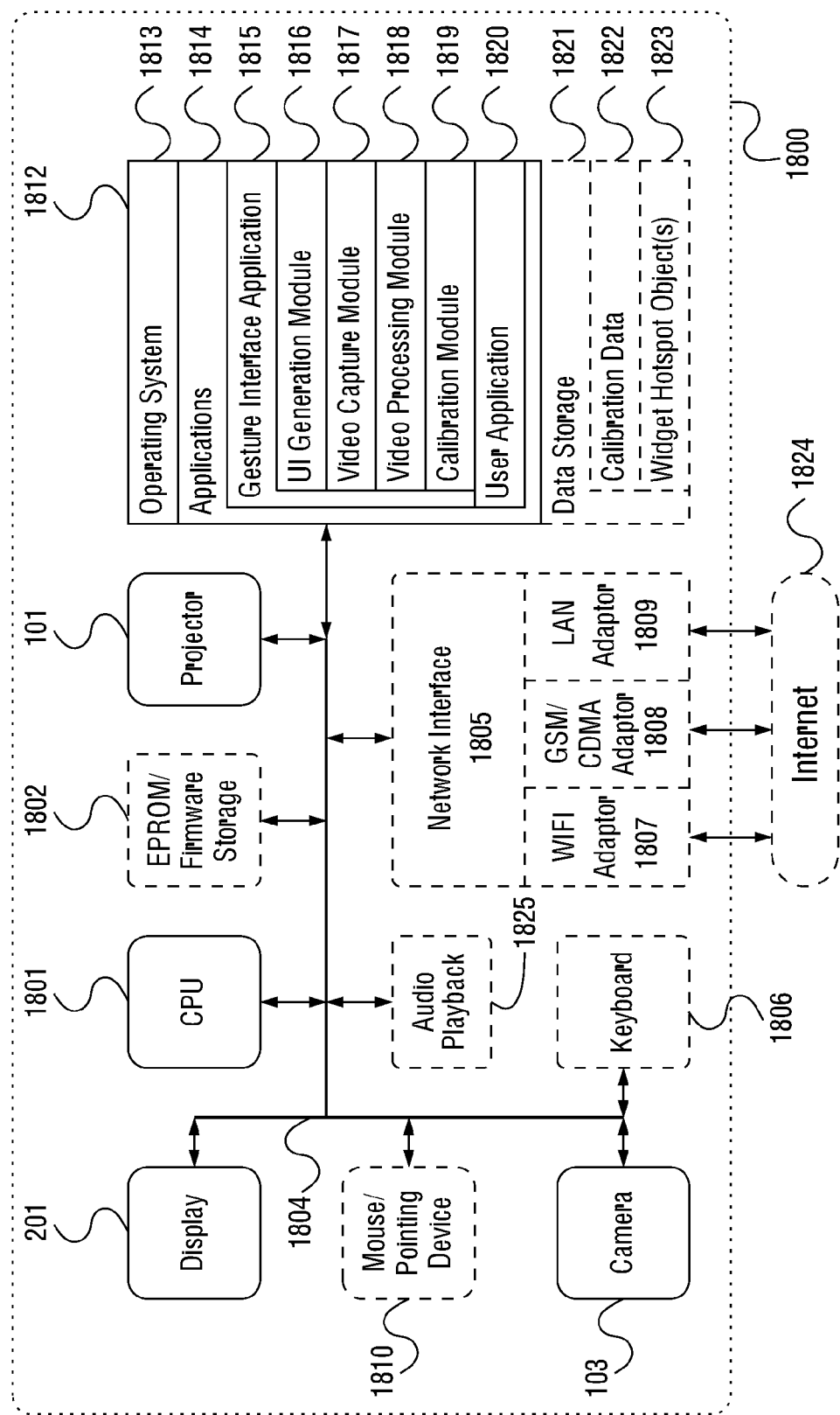
FIG. 18 illustrates an exemplary embodiment of an inventive computerized system for detecting user gestures using user interface widgets.

FIG. 18 illustrates an exemplary embodiment of a computerized system 1800 for detecting user gestures by analyzing dynamic patterns of occlusion of widget hotspot(s). In one or more embodiments, the computerized system 1800 may be implemented within the form factor of a desktop computer well known to persons of skill in the art. In an alternative embodiment, the computerized system 300 may be implemented based on a laptop or a notebook computer.

The computerized system 1800 may include a data bus 1804 or other interconnect or communication mechanism for communicating information across and among various hardware components of the computerized system 1800, and a central processing unit (CPU or simply processor) 1801 electrically coupled with the data bus 1804 for processing information and performing other computational and control tasks. Computerized system 1800 also includes a memory 1812, such as a random access memory (RAM) or other dynamic storage device, coupled to the data bus 1804 for storing various information as well as instructions to be executed by the processor 1801. The memory 1812 may also include persistent storage devices, such as a magnetic disk, optical disk, solid-state flash memory device or other non-volatile solid-state storage devices.

In one or more embodiments, the memory 1812 may also be used for storing temporary variables or other intermediate information during execution of instructions by the processor 1801. Optionally, computerized system 1800 may further include a read only memory (ROM or EPROM) 1802 or other static storage device coupled to the data bus 1804 for storing static information and instructions for the processor 1801, such as firmware necessary for the operation of the computerized system 1800, basic input-output system (BIOS), as well as various configuration parameters of the computerized system 1800.

In one or more embodiments, the computerized system 1800 may incorporate a display device 201, which may be also electrically coupled to the data bus 304, for displaying various information to a user of the computerized system 1800, such as user interfaces incorporating the widget(s) described herein. In an alternative embodiment, the display device 201 may be associated with a graphics controller and/or graphics processor (not shown). The display device 201 may be implemented as a liquid crystal display (LCD), manufactured, for example, using a thin-film transistor (TFT) technology or an organic light emitting diode (OLED) technology, both of which are well known to persons of ordinary skill in the art. In various embodiments, the display device 201 may be incorporated into the same general enclosure with the remaining components of the computerized system 1800. In an alternative embodiment, the display device 201 may be positioned outside of such enclosure, such as on the surface of a table or a desk. In one or more embodiments, the computerized system 1800 may further incorporate the projector or mini-projector 101 configured to project information, such as user interface(s) incorporating the widgets described herein, onto display surface 102, see FIG. 1.

In one or more embodiments, the computerized system 1800 may further incorporate an audio playback device 1825 electrically connected to the data bus 1804 and configured to play various audio files, such as MPEG-3 files, or audio tracks of various video files, such as MPEG-4 files, well known to persons of ordinary skill in the art. To this end, the computerized system 1800 may also incorporate waive or sound processor or a similar device (not shown).

In one or more embodiments, the computerized system 1800 may incorporate one or more input devices, such as a mouse/pointing device 1810, such as a mouse, a trackball, a touchpad, or cursor direction keys for communicating direction information and command selections to the processor 1801 and for controlling cursor movement on the display 201. This input device typically has two degrees of freedom in two axes, a first axis (e.g., x) and a second axis (e.g., y), that allows the device to specify positions in a plane.

The computerized system 1800 may further incorporate the camera 103 for acquiring still images and video of various objects, including the video of the widgets described herein, as well as a keyboard 1806, which all may be coupled to the data bus 1804 for communicating information, including, without limitation, images and video, as well as user commands (including gestures) to the processor 1801.

In one or more embodiments, the computerized system 1800 may additionally include a communication interface, such as a network interface 1805 coupled to the data bus 1804. The network interface 1805 may be configured to establish a connection between the computerized system 1800 and the Internet 1824 using at least one of a WIFI interface 1807, a cellular network (GSM or CDMA) adaptor 1808 and/or local area network (LAN) adaptor 1809. The network interface 1805 may be configured to enable a two-way data communication between the computerized system 1800 and the Internet 1824. The WIFI adaptor 1807 may operate in compliance with 802.11a, 802.11b, 802.11g and/or 802.11n protocols as well as Bluetooth protocol well known to persons of ordinary skill in the art. The LAN adaptor 1809 of the computerized system 1800 may be implemented, for example, using an integrated services digital network (ISDN) card or a modem to provide a data communication connection to a corresponding type of telephone line, which is interfaced with the Internet 1824 using Internet service provider's hardware (not shown). As another example, the LAN adaptor 1809 may be a local area network interface card (LAN NIC) to provide a data communication connection to a compatible LAN and the Internet 1824. In an exemplary implementation, the WIFI adaptor 1807, the cellular network (GSM or CDMA) adaptor 1808 and/or the LAN adaptor 1809 send and receive electrical or electromagnetic signals that carry digital data streams representing various types of information.

In one or more embodiments, the Internet 1824 typically provides data communication through one or more sub-networks to other network resources. Thus, the computerized system 1800 is capable of accessing a variety of network resources located anywhere on the Internet 1824, such as remote media servers, web servers, other content servers as well as other network data storage resources. In one or more embodiments, the computerized system 1800 is configured to send and receive messages, media and other data, including application program code, through a variety of network(s) including the Internet 1824 by means of the network interface 1805. In the Internet example, when the computerized system 1800 acts as a network client, it may request code or data for an application program executing on the computerized system 1800. Similarly, it may send various data or computer code to other network resources.

In one or more embodiments, the functionality described herein is implemented by computerized system 1800 in response to processor 1801 executing one or more sequences of one or more instructions contained in the memory 1812. Such instructions may be read into the memory 1812 from another computer-readable medium. Execution of the sequences of instructions contained in the memory 1812 causes the processor 1801 to perform the various process steps described herein. In alternative embodiments, hard-wired circuitry may be used in place of or in combination with software instructions to implement the embodiments of the invention. Thus, the described embodiments of the invention are not limited to any specific combination of hardware circuitry and/or software.

The term "computer-readable medium" as used herein refers to any medium that participates in providing instructions to the processor 1801 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to the processor 1801 for execution. For example, the instructions may initially be carried on a magnetic disk from a remote computer. Alternatively, a remote computer can load the instructions into its dynamic memory and send the instructions over the Internet 1824. Specifically, the computer instructions may be downloaded into the memory 1812 of the computerized system 1800 from the foresaid remote computer via the Internet 1824 using a variety of network data communication protocols well known in the art.

In one or more embodiments, the memory 1812 of the computerized system 1800 may store any of the following software programs, applications or modules:

1. Operating system (OS) 1813 for implementing basic system services and managing various hardware components of the computerized system 300. Exemplary embodiments of the operating system 1813 are well known to persons of skill in the art, and may include any now known or later developed mobile operating systems.

2. Applications 1814 may include, for example, a set of software applications executed by the processor 1801 of the computerized system 1800, which cause the computerized system 1800 to perform certain predetermined functions, such as display user interface(s) on the display device 201 or detect user's gestures using the camera 103. In one or more embodiments, the applications 1814 may include an inventive gesture interface application 1815, described in detail below as well as a user application 1820.

3. Data storage 1821 may include, for example, a calibration data storage 1822 for storing calibration data generated by the calibration module 1819 as well as widget hotspot object(s) storage 1823 for storing the aforesaid history of the sensed sensor pixel values associated with widget's hotspot.

In one or more embodiments, the inventive gesture interface application 1815 incorporates a user interface generation module 1816 configured to generate an a user interface incorporating widget(s) described herein using the display 201 or the projector 101 of the computerized system 1800. The inventive gesture interface application 1815 may further include video capture module for causing the camera 103 to capture the video of the occluded widgets, the video processing module for processing the video acquired by the camera 103 and detecting user gestures based on dynamic patterns of occlusion of the user interface widgets, as well as the calibration module 1819 for properly configuring the video processing module 1818 to perform transformations from the video image coordinates to the widget's logical coordinates as described in detail above. Upon detecting user gestures, the inventive gesture interface application 1815 may send the appropriate control commands to the user application 1820.

Figure 19:
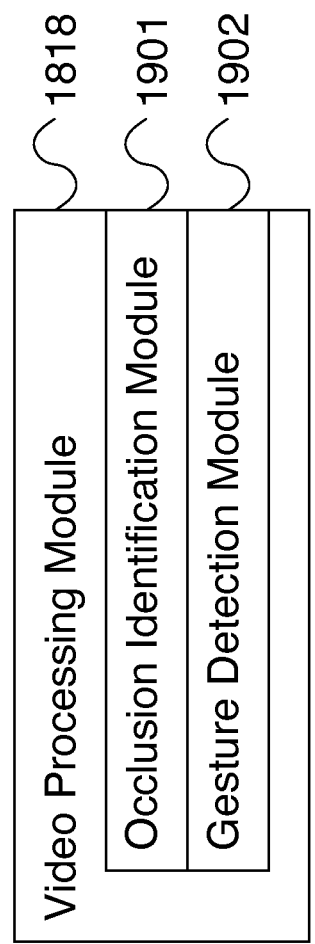
FIG. 19 illustrates an exemplary embodiment of a video processing module.

FIG. 19 illustrates an exemplary embodiment of the video processing module 1818. In one or more embodiments, as shown in FIG. 19, the video processing module 1818 incorporates an occlusion identification module 1901 for identifying occlusion of at least a portion of the widget in the acquiring image of the user interface and a gesture detection module 1902 for detecting a gesture performed by the user based on the identified occlusion of the at least the portion of the widget. The aforesaid modules 1901 and 1902 operate in accordance with the method described above.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods for detecting user gestures using dynamic patterns of occlusion of widget hotspot(s). It is intended that the specification and examples be considered as exemplary only, with a true scope and spirit of the invention being indicated by the following claims.

What is claimed is:

1. A computer-implemented method for detecting a gesture performed by a user in connection with a user interface widget comprising a hotspot, the method being performed in a computerized system comprising a central processing unit, a camera and a memory, the computer-implemented method comprising:
   a. acquiring a plurality of images of the hotspot using the camera;
   b. using the central processing unit to identify occlusion of at least a portion of the hotspot by the user in the acquired plurality of images of the hotspot, wherein the occlusion of the portion of the hotspot is identified by detecting changes in color values of each of a plurality of non-contiguous image sensor pixels within the acquired plurality of images of the hotspot based on a recorded history of values of the plurality of non-contiguous image sensor pixels; and
   c. using the central processing unit to detect the gesture performed by the user based on the identified occlusion of the at least the portion of the hotspot in at least two of the acquired plurality of images of the hotspot.

2. The computer-implemented method of claim 1, wherein the user interface widget is a button widget associated with a button press event and wherein the computer-implemented method further comprises generating the button press event if the detected gesture is a swipe gesture over the hotspot.

3. The computer-implemented method of claim 1, further comprising storing a history of the identified occlusion of the hotspot in the memory.

4. The computer-implemented method of claim 1, further comprising projecting the widget onto a display surface using a projector.

5. The computer-implemented method of claim 1, wherein the computerized system further comprises a liquid crystal display panel, the computer-implemented method further comprising displaying the widget on the liquid crystal display panel.

6. The computer-implemented method of claim 1, wherein in c. the gesture is detected based on a condition that a second portion of the hotspot is not occluded.

7. The computer-implemented method of claim 6, wherein the hotspot comprises a stripe and wherein the gesture performed by the user comprises a swipe over the stripe.

8. The computer-implemented method of claim 6, wherein the hotspot comprises a stripe and wherein the gesture performed by the user comprises a pinch gesture.

9. The computer-implemented method of claim 6, wherein the hotspot comprises a stripe with an empty slot and wherein the gesture performed by the user comprises covering the empty slot.

10. The computer-implemented method of claim 6, wherein the second portion of the hotspot is discontiguous.

11. The computer-implemented method of claim 1, further comprising, responsive to the detection of the gesture performed by the user, issuing a command associated with the gesture.

12. The computer-implemented method of claim 11, further comprising detecting a direction of the gesture performed by the user, wherein the issued command is based, at least in part, on the detected direction of the gesture.

13. The computer-implemented method of claim 11, further comprising detecting a speed of the gesture performed by the user, wherein the issued command is based, at least in part, on the detected speed of the gesture.

14. The computer-implemented method of claim 1, wherein the gesture is performed by the user without physical contact with the surface carrying or displaying the widget.

15. The computer-implemented method of claim 1, further comprising performing a calibration operation by comparing acquired images corresponding to a plurality of appearances of the widget.

16. The computer-implemented method of claim 3, wherein in c. the detecting comprises comparing recorded values associated with a plurality of sensor pixels with a predetermined pattern.

17. The computer-implemented method of claim 3, wherein in c. the detecting comprises using a finite state machine state transition table.

18. The computer-implemented method of claim 3, further comprising repeating a. through c. if it is determined in c. that a predetermined pattern associated with a gesture has not occurred.

19. The computer-implemented method of claim 3, further comprising performing sub-sampling of a plurality of sensor pixels corresponding to the hotspot.

20. A non-transitory computer-readable medium embodying a set of computer-executable instructions, which, when executed in a computerized system comprising a central processing unit, a camera and a memory, cause the computerized system to perform a method for detecting a gesture performed by a user in connection with a widget comprising a hotspot, the method comprising:
- a. acquiring a plurality of images of the hotspot using the camera;
- b. using the central processing unit to identify occlusion of at least a portion of the hotspot by the user in the acquired plurality of images of the hotspot, wherein the occlusion of the portion of the hotspot is identified by detecting changes in color values of each of a plurality of non-contiguous image sensor pixels within the acquired plurality of images of the hotspot based on a recorded history of values of the plurality of non contiguous image sensor pixels; and
- c. using the central processing unit to detect the gesture performed by the user based on the identified occlusion of the at least the portion of the hotspot in at least two of the acquired plurality of images of the hotspot.

21. A computerized system comprising one or more processing units and a memory, the computerized system further comprising:

- a. a user interface generation module executed by the one or more processing units for causing a user interface to be displayed to a user, the user interface comprising a widget;
- b. a camera for acquiring an image of the user interface;
- c. an occlusion identification module executed by the one or more processing units for identifying occlusion of at least a portion of the widget in the acquired image of the user interface, wherein the occlusion of the portion of the widget is identified by the occlusion identification module by detecting changes in color values of each of a plurality of non-contiguous image sensor pixels within the acquired image of the user interface based on a recorded history of values of the plurality of non-contiguous image sensor pixels; and
- d. a gesture detection module executed by the one or more processing units for detecting a gesture performed by the user based on the identified occlusion of the at least the portion of the widget.

* * * * *